US005614130A

United States Patent [19]

Müller et al.

[11] Patent Number: 5,614,130

[45] Date of Patent: Mar. 25, 1997

[54] DEVICE FOR A BEVERAGE BREWING MACHINE FOR THE HEATING AND EMULSIFICATION OF LIQUIDS

[75] Inventors: Roland Müller, Dreieich; Ludwig Littmann, Kronberg, both of Germany

[73] Assignee: Braun Aktiengesellschaft, Kronberg, Germany

[21] Appl. No.: 595,973

[22] Filed: Feb. 6, 1996

Related U.S. Application Data

[63] Continuation of Ser. No. 288,473, Aug. 10, 1994, abandoned.

[30] Foreign Application Priority Data

Aug. 12, 1993 [DE] Germany .......................... 43 27 085.9

[51] Int. Cl.$^{6}$ .............................. A47J 31/41; A47J 43/12

[52] U.S. Cl. .................................... 261/119.1; 261/121.1; 261/DIG. 16; 261/DIG. 76

[58] Field of Search .................... 261/DIG. 16, DIG. 76, 261/119.1, 121.1; 99/293

[56] References Cited

U.S. PATENT DOCUMENTS

| | | | |
|---|---|---|---|
| 4,800,805 | 1/1989 | Mahlich et al. | 261/121.1 |
| 4,852,473 | 8/1989 | Azpitarte Bolivar | 99/293 |
| 4,852,474 | 8/1989 | Mahlich et al. | 261/DIG. 76 |
| 4,960,042 | 10/1990 | Grossi | 261/DIG. 76 |
| 5,233,915 | 8/1993 | Siccardi | 261/DIG. 16 |
| 5,265,520 | 11/1993 | Giuliano | 99/293 |
| 5,277,849 | 1/1994 | Morton et al. | 261/DIG. 16 |
| 5,330,266 | 7/1994 | Stubaus | 261/DIG. 76 |
| 5,335,588 | 8/1994 | Mahlich | 261/DIG. 76 |
| 5,339,725 | 8/1994 | De'Longhi | 261/DIG. 76 |

FOREIGN PATENT DOCUMENTS

| | | | |
|---|---|---|---|
| 0287906 | 10/1988 | European Pat. Off. . | |
| 3538041A1 | 10/1985 | Germany . | |
| 3829326 | 3/1990 | Germany | 99/293 |

*Primary Examiner*—Khanh P. Nguyen
*Attorney, Agent, or Firm*—Fish & Richardson, P.C.

[57] ABSTRACT

The present invention relates to a device for a beverage brewing machine for the heating and emulsification of liquids, in particular for the preparation of the coffee with milk beverage "Cappuccino". The device comprises a pipe and a nozzle succeeding in the lower section to the bore, from the orifice of which nozzle hot steam exits during operation. The nozzle is encompassed by the pipe such that an annular chamber is formed around the nozzle, which chamber is open in the direction of flow. The open end of the annular chamber extends beyond the orifice of the nozzle. Apertures are formed at the pipe at the level of the orifice of the nozzle, through which the air, which is necessary for the emulsification, can enter the annular chamber. Further, rib structure is provided at the pipe which permits a user to keep a defined distance between the orifice of the nozzle and the liquid's surface by visual check. Handling is considerably simplified during the emulsification of milk, because the visual check means permits a user to easily maintain the distance of the orifice of the nozzle from the surface of the milk. Good froth results are obtained.

24 Claims, 2 Drawing Sheets

50
45
6
4
14
7
47
46
8
12
48
3
15
9
49
13
16
2
17
10
5
Y
1
11
d
33
22
19
21
30
26
28
20
41
30
29
L
43
31
25
18
29
24
27
23
31
40
D
42
42
Y
X
Y

DEVICE FOR A BEVERAGE BREWING MACHINE FOR THE HEATING AND EMULSIFICATION OF LIQUIDS

This is a continuation of application Ser. No. 08/288,473, filed Aug. 10, 1994 now abandoned.

The present invention relates to a device for a beverage brewing machine for the heating and emulsification of liquids, in particular for the preparation of the coffee with milk beverage "Cappuccino", comprising a pipe and a subsequent nozzle, from the orifice of which hot steam exits, the latter mixing with the ambient air, and the so produced steam-and-air mixture penetrating into the milk and frothing it when the orifice of the nozzle is maintained at a small distance from the surface of the liquid.

BACKGROUND OF THE INVENTION

A device of this type is used, for example, in the espresso coffee machine named "coffee GAGGIA" of Messrs. BREVETTI GAGGIA S.p.A. in Robecco S/Naviglio (MI). This device is composed of a steam pipe connected to the steam heater of the espresso coffee machine, at the end of which pipe a nozzle with an orifice is provided.

To froth and heat milk, a user must hold the orifice of the nozzle at a defined distance from the surface of the milk so that as much air as possible is directed into the milk, which will then be enclosed as air bubbles in the milk. However, which distance is to be kept can only be determined roughly by several attempts.

If, for example, the orifice of the nozzle is immersed too deep into the milk, no air at all will be directed into the milk, and the steam only condenses to water in the milk and, further, disperses its heat to the milk. On the other hand, if the orifice of the nozzle is kept at too far a distance from the surface of the liquid, no milk froth will be produced in this case either, since the steam-and-air mixture is not blown into the milk sufficiently deep in order to emulsify with the milk. Thus, in practice, a user will move the surface of the milk up and down in respect of the nozzle in order to thereby arrive at the distance which is optimal for good froth results, at least every now and then, with the objective of obtaining a fairly good milk froth.

Further, DE-A1-35 38 041 discloses a device for the heating and emulsification of milk, wherein the steam pipe section and the subsequent nozzle are encompassed by a pipe of larger diameter, forming an annular chamber with these parts. The pipe projects beyond the orifice of the nozzle and tapers towards its end, where another orifice is provided which extends concentrically to the orifice of the nozzle and the diameter of which is substantially identical with, or slightly larger than, the diameter of the nozzle. Apertures to aspirate milk are provided at the pipe at the level of the nozzle's orifice. Far above the nozzle, another aperture is provided at the pipe which serves as an entry for the air.

This device works according to a completely different principle as compared to the device described before, since it can be immersed into the milk as deep as desired, however, at most until the position of the upper aperture. This is because the nozzle in this device is a nozzle according to the immersion principle. When hot steam exits from the orifice of the nozzle, vacuum develops in the annular chamber ensuring, on the one hand, that air is aspirated through the upper aperture, and milk is aspirated through the lower apertures and is then frothed by the entering air and, subsequently, exits from the opening provided at the tip of the pipe and is directed into the milk. Not only is this device complicated, in addition, the milk is not frothed as good as this is done by way of the single nozzle described hereinabove, the device's efficiency being limited.

SUMMARY OF THE INVENTION

Therefore, the object of the present invention is to provide a device for a beverage brewing machine for the heating and emulsification of liquids, in particular for the preparation of the coffee with milk beverage Cappuccino of the kind initially referred to, which has a particularly simple design, lends itself to ease of manufacture and special ease of handling, while good froth results are obtained.

This object is achieved according to the present invention by means fitted to the pipe or the nozzle, respectively, that permits a user to maintain an exactly predefined distance between the orifice of the nozzle and the surface of the liquid by visual check, the milk being effectively frothed and heated in an extremely short time, while undesirable spattering of the milk is prevented. Due to its simple design, the device can be made of one single piece, preferably, of plastics. However, it is also possible that the device is a cast iron chilled piece made of metal, preferably, aluminium, brass, stainless steel or any other castable metal.

Upon application of the device according to the present invention, the vessel filled with milk is moved so close to the device that the visual check means provided at the device touches the surface of the milk. When hot steam is conveyed through the nozzle, vacuum develops in the annular chamber, and, as a result, air enters into the annular chamber through the apertures provided at the pipe and mixes with the hot steam. The so produced air-and-steam mixture is directed under pressure into the milk, where it forms small air bubbles, while heat disperses, which remain enclosed in the milk, milk froth resulting therefrom. Due to the fact that a user is permitted to precisely observe the distance between the orifice of the nozzle and the surface of the milk by way of the visual check means, the milk is frothed and heated optimally and in the shortest possible time.

In a particular embodiment, a milk flow circuit develops during emulsification, the milk being aspirated from outside through the apertures, mixed with air and directed into the milk again. Subsequently, the milk or, respectively, the milk froth which resulted already is conveyed again from outside to the apertures. This way, a closed flow circuit results at each aperture, optimal emulsification and a uniform heating of the milk emulsion being accomplished.

Ribs, which are evenly distributed over the periphery of the pipe, serve to convey the milk and the milk froth, which developed already, to the slots, the flow speed increasing. The ribs extending radially to the centre of the nozzle also directs the milk from outwards radially in the direction of the nozzle, the space being enclosed by two ribs forming a compartment to a certain extent which is closed in relation to the neighbouring compartments. To a certain extent, this causes the flow of the milk to calm down before the milk enters the annular chamber through the slots. Although the ribs are not immersed into the milk, during emulsification, the milk is subjected to such a circular flow movement that the rising milk flow, at the surface, causes waves around the device, which circularly plunge from outside into the compartment that is each time formed by two neighbouring ribs.

A particularly simple visual check means results because the end faces of the ribs, which end flush with the front side at the open end of the pipe, extend perpendicular to the longitudinal axis of the device, that means, roughly in parallel to the surface of the milk during frothing. The advantage of this arrangement at the device results during operation, provided that the device is always attached to the steam pipe of the beverage brewing machine in such a fashion that the front side of the pipe and the end face of the ribs extend horizontally. In this case, the liquid contained in the vessel is always in parallel to the end face of the ribs, no matter how a user holds the vessel.

The visual check means can be seen particularly easily by a user so that the surface level can be conformed to the level of the visual check means in an especially simple way. Straight-lined rib contours facilitate the handling, operation and manufacture of the device.

Since a particularly strong steam jet at the nozzle causes a particularly intensive mixing process along with major waves on the surface of the milk, a specific apportioning of the milk flow at the ribs is accomplished in the upper area also, which is farther away from the nozzle.

Air as well as the milk which is already dispersed by air, is aspirated from all sides through the apertures into the annular chamber so that the jet of hot steam exiting from the orifice of the nozzle can catch the air and the liquid evenly from all sides. This results in a particularly intensive and uniform mixing and the formation of air inclusions in the milk.

The milk is frothed particularly vigorously, provided, however, a steam pressure in the pipe in front of the nozzle of approximately 1 to 2 bar, preferably 1.5 bar. To achieve a particularly high exit speed at the orifice of the nozzle, the bore in the pipe tapers towards the nozzle from 4.8 mm to roughly 1 mm in diameter. Further, the device operates according to the principle of an ejector booster pump, that means due to the high exit speed of the steam jet at the orifice of the nozzle, vacuum results in the annular chamber so that air and milk are aspirated from outside through the apertures into the annular chamber. When the steam jet impinges upon the surface of the milk, it will, nevertheless, not be spattered to any appreciable degree.

The volume of the annular chamber is chosen to be only so large that the air and milk flowing in through the apertures are conveyed to the hot steam jet as directly as possible, in order to mix and froth the milk intensively.

The device may be of a particularly simple design, which can be formed easily in manufacture and lends itself to ease of washing after use.

The device can be detached from, and coupled to, the steam pipe which is fixed to the beverage brewing machine, so that it is possible to clean it.

Favourably, the coupling device is a clip-on connect as it is generally known from the state of the art for the coupling of pipes. However, the coupling device may be a detachable clamping seat as well, the clamping engagement, for example, consisting in an O-ring, made of any elastomeric material and mounted in the pipe, the O-ring being compressed radially by the steam pipe on mounting of the device such as to provide a rigid connection between the device and the steam pipe. The O-ring can lockingly engage into annular grooves provided on both the pipe and the steam pipe.

BRIEF DESCRIPTION OF THE DRAWINGS

One embodiment of the present invention is shown in the drawing and will be described hereinbelow. In the drawing.

DESCRIPTION OF PARTICULAR EMBODIMENT

Figure 1:
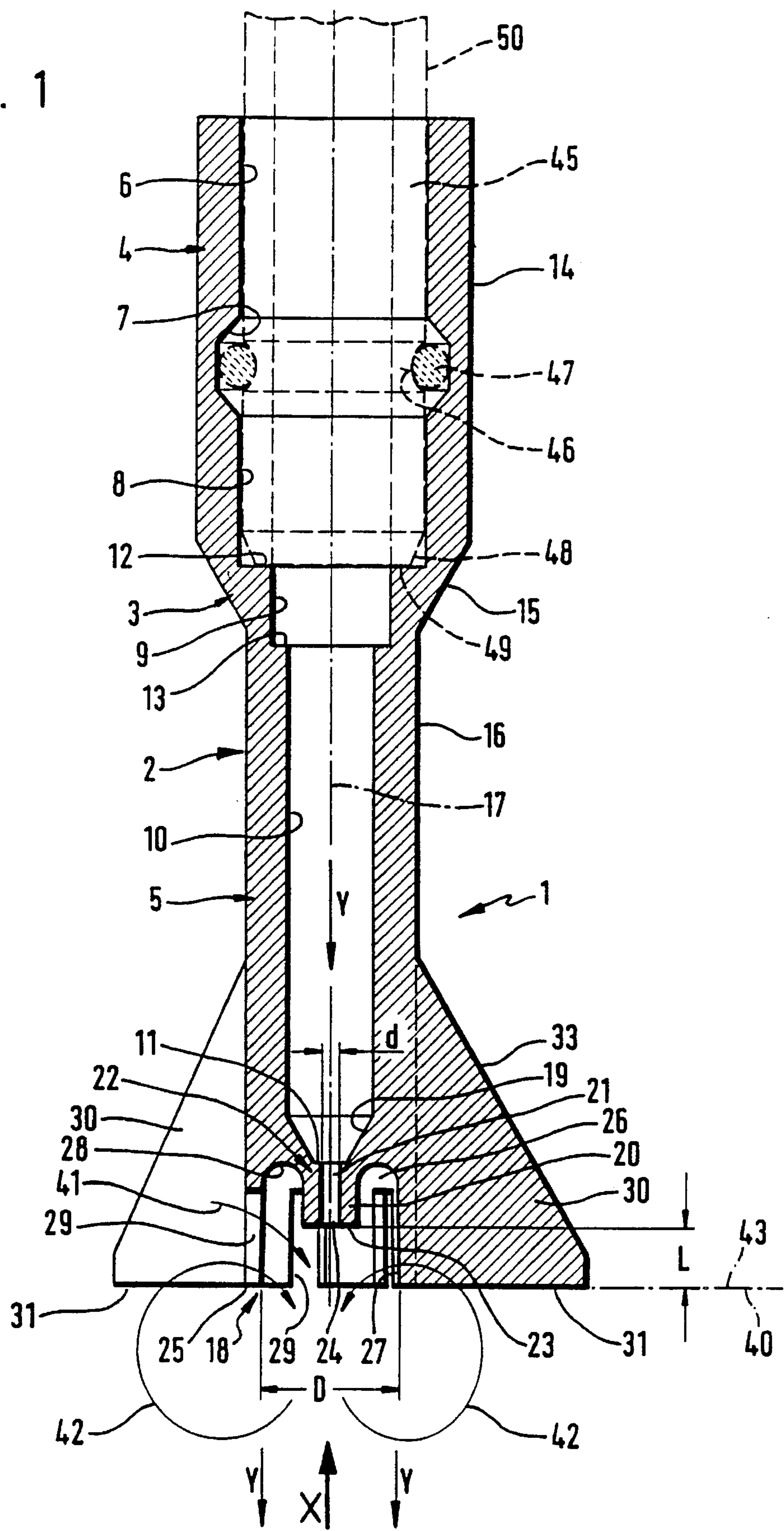
FIG. 1 is a longitudinal cross-section through the device taken along the line of intersection I—I of FIG. 2.

According to FIG. 1, the device 1 is substantially composed of a straight pipe 2, annular in cross-section, which is subdivided into an upper section 4 and a lower section 5 by a step 3 which expands conically in opposition to the direction of flow Y of the hot steam jet. The upper section 4 serves to accommodate the steam pipe 45 (shown in broken lines), which is part of a beverage brewing machine, the outside surface 50 of which centers the device 11 through the bores 6 and 8 on the machine. In bore 6 of the upper section 4, an annular groove 7 is provided in which an O-ring 47 (shown in broken lines) is mounted. Also, an annular groove 46 is provided at the same level on the steam pipe 45, in which the O-ring 47 is engaged under radial preload when the steam pipe 45 is sealedly and rigidly connected to the device 1.

To detach the device 1 from the steam pipe 45, the device 1 according to FIG. 1 is simply drawn downwardly in the direction Y so that the O-ring 47 is urged into the annular groove 7 and the outside surface 50 can slide on it. The O-ring 47 along with the annular grooves 7, 46 forms the coupling arrangement for the device 1. In order to slip the device 1 on the steam pipe 45 again, the steam pipe 45 is furnished with a chamfer 48 at its free end which urges the O-ring 47 radially outwardly when it is slipped on. In the end position, the end face 49 of the steam pipe 45 moves to abut on the step 12 of the device 1.

According to FIG. 1, the bore 6 is succeeded in the direction of flow Y by three bores 8, 9, 10 which taper over a step 12 and 13 each. Bores 8, 9 and 10 extend concentrically relative to the peripheral surfaces 14, 15 and 16 of the pipe 2 so that these have one common axis 17.

Following the bore 10 in the direction of flow Y in FIG. 1, above and close to the open end 18 of the pipe 2 is a step 19, which is directed to the open end 18 and tapers conically, adjacent to which step, further, is a pipe section 20 of smaller diameter which is provided with a through bore 21 having the diameter d. Through bore 21 forms the nozzle 22 of the device 1, at the frontal end 23 of which the orifice 24 is provided. The pipe section 20 with its through bore 21 extends concentrically to the bores 8, 9 and 10 and to the peripheral surfaces 14 and 16.

The lower pipe section 5 extends in the direction of flow Y beyond the orifice 24 and ends in the front side 25 which extends perpendicular to the axis 17. The front side 25 is arranged at a distance L from the frontal end 23 of the nozzle 22. The peripheral surface 16 extends over the entire lower section 5 roughly on the same diameter. In about at the level of the end 11 of step 19, which is the lower end in the drawing, an annular chamber 26 encompassing the pipe section 20 is formed which terminates at the level of the front side 25, that is, at the open end 18. The diameter of the inside wall 27 of the annular chamber 26 is smaller than the diameter of the peripheral surface 16 of the pipe 2, however, the wall's diameter is larger than the diameter of the bore 10.

The bottom 28 of the annular chamber 26, which extends roughly at the level of the lower end 11 of step 19, is formed by a circumferential chute which is curved in opposition to the direction of flow Y. The inside wall 27 of the annular chamber 26 extends likewise concentrically to the through bore 21. Slightly above the orifice 24, five apertures 29 in the shape of slots are provided at the lower section 5 of the pipe 2, distributed evenly over the periphery, the said apertures extending up to the front side 25, that is up to the open end 18 of the annular chamber 26. The apertures 29 have a square cross-section of 50 $mm^2$ in total. The inside wall 27 of the annular chamber 26 has the diameter D.

Figure 2:
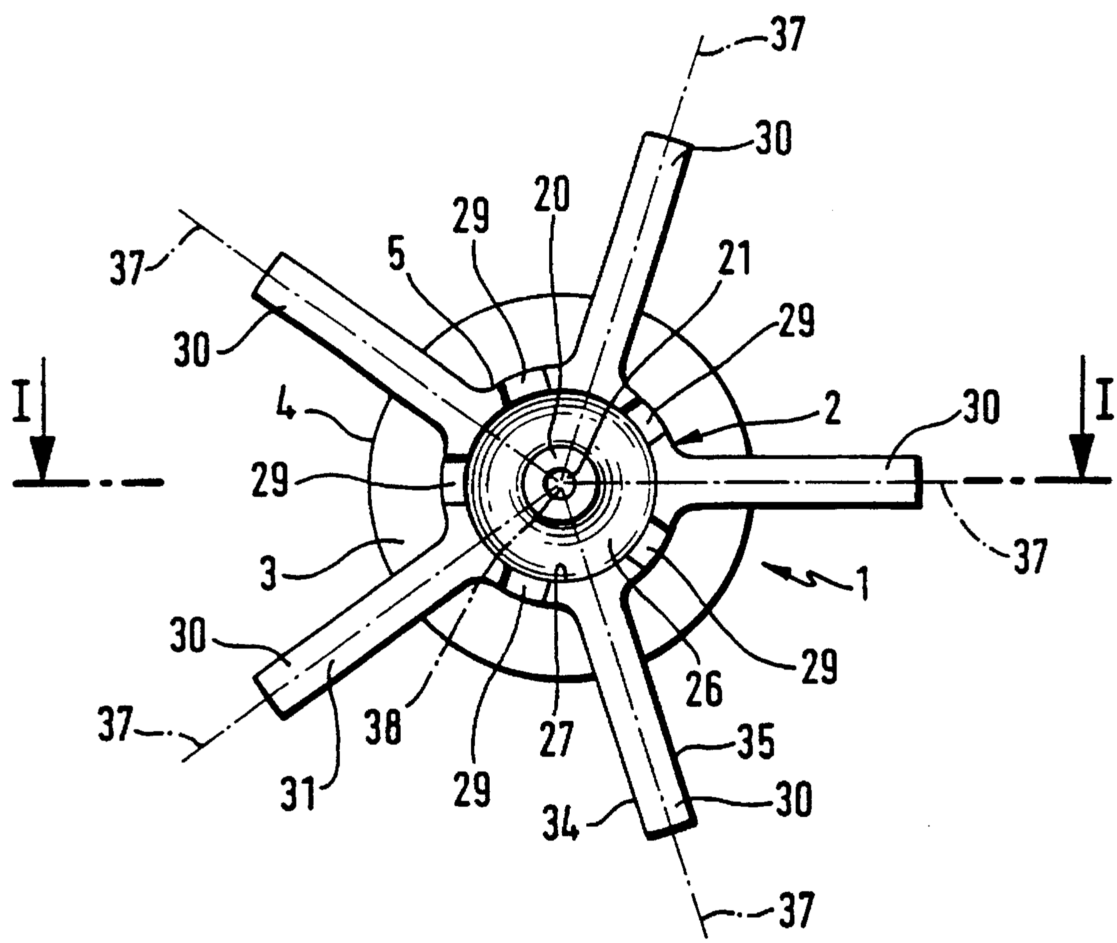
FIG. 2 is a plan view in the direction X according to FIG. 1, that means, from below on the device.

Above the step 19, according to FIGS. 1 and 2, ribs 30, triangular in cross-section, are formed at the peripheral surface 16 of the lower section 5, the one end face 31 of which forming the cathetus of the triangle ending flush with the front side 25 of the pipe 2. The hypotenuse of the triangle is formed by the outside surface 33 pointing radially outwardly. The lateral surfaces 34, 35 of the ribs 30 extend in parallel to each other according to FIG. 2, each of its central axes 37 intersecting the common central point 38 of the device 1. The ribs 30 are arranged centrically in respect of each slot 29 so that five ribs 30 result which are shaped evenly at the periphery of the lower section 5 of the pipe 2. The slots 29 establish a connection from outside to the annular chamber 26.

It is, of course, also possible that the ribs 30 adopt any other shape in cross-section. What is important though is that their end faces 31 end flush with the front side 25 of the pipe 2 and, thus, extend in horizontal direction relative thereto. According to FIG. 1, the front side 25 in conjunction with the end face 31 of the ribs 30 forms the visual check means 40 of the device 1, the visual check means 40, simultaneously, representing the surface 43 of the liquid, preferably milk, in operation.

The mode of function of the device according to the present invention is as follows:

As soon as the device 1 is slipped onto the steam pipe 45, shown in FIG. 1, of a breverage brewing machine (not shown), after switch-on of the beverage brewing machine and subsequent operation of a steam valve (not shown), steam can enter through the steam pipe 45 into the device 1, from where it is supplied through bore 10 to the step 19. Since step 19 tapers in the direction of flow Y, the steam is accelerated at this point such that it is transported at high speed through the through bore 21 of the nozzle 22, a strong and focused jet of hot steam exiting at the orifice 24 of the nozzle 22 as a result.

When a user has moved a vessel filled with milk (not shown) so close to the device that the surface (shown by phantom lines 43 in FIG. 1) of the milk is just touching the front side 25 of the pipe 2 and the end faces 31 of the ribs 30, that means the visual check means 40, which may also be coloured, for example, is flush with the surface 43 of the milk, first the steam jet (not shown) emits into the surface of the milk by forming a vacuum in the annular chamber 26. Due to the vacuum which developed in the annular chamber 26, air from outside flows through the upper area of the apertures 29 into the annular chamber 26, is caught by the jet of hot steam and, likewise, enters the surface of the milk. The course of flow resulting therefrom is shown by the arrow 41 approximately. The air emitting into the milk by turbulences is shattered to small air bubbles which get stuck in the milk due to its viscosity. On the other hand, the jet of hot steam condenses in the milk to water; however, as the hot steam is very dry, only small portions of water are bound in the milk.

Due to the very vigorous and continuous injection of the steam-and-air mixture into the surface of the milk, turbulences in the milk are caused, which are roughly shown by the arrow 42, and, that is to say, uniformly in all slots. The milk is conveyed from outside through the ribs 30 to the slots 29, radially in the direction of the central point 38. The milk is deflected with great acceleration in the direction of flow Y, and, in doing so, it is intensively mixed with the steam-and-air mixture.

Owing to the device 1 according to the present invention, particular ease of handling during emulsification results, permitting to rapidly froth milk in particular, in a short time. The froth obtained is so solid in its consistency that it is extremely lasting.

We claim:

1. A device for a beverage brewing machine for the heating and emulsification of liquids comprising pipe structure that has an open end and nozzle structure, said nozzle structure having an orifice from which hot steam exits for mixing with ambient air and producing a steam-and-air mixture for penetrating into the liquid and frothing it when said nozzle orifice is maintained at a small distance from the surface of the liquid, said nozzle structure being encompassed by said pipe structure such that an annular chamber is formed around said nozzle structure which chamber is open only in the direction of steam flow (Y), the open end of said chamber extending beyond said orifice of said nozzle structure, said pipe structure including an aperture at a level adjacent to said orifice of said nozzle through which air, which is necessary for emulsification, can enter said annular chamber, and visual check structure fitted to said pipe structure, said visual check structure including an end surface at a level beneath said nozzle orifice, said end surface extending beyond an outer periphery of said pipe structure above said aperture to permit a user to maintain a defined distance between said nozzle orifice and the surface of the liquid by visual check.

2. A device for a beverage brewing machine for the heating and emulsification of liquids comprising pipe structure that has an open end and nozzle structure, said nozzle structure having an orifice from which hot steam exits for mixing with ambient air and producing a steam-and-air mixture for penetrating into the liquid and frothing it when said nozzle orifice is maintained at a small distance from the surface of the liquid, said nozzle structure being encompassed by said pipe structure such that an annular chamber is formed around said nozzle structure which chamber is open only in the direction of steam flow (Y), the open end of said chamber extending beyond said orifice of said nozzle structure, said pipe structure including a slot at a level adjacent to said orifice of said nozzle through which air, which is necessary for emulsification, can enter said annular chamber, said slot extending to said open end of said pipe structure and visual check structure fitted to said pipe structure to permit a user to maintain a defined distance (L) between said nozzle orifice and the surface of the liquid by visual check.

3. The device of claim 2 wherein said pipe structure includes structure defining a plurality of slots at the level of said nozzle orifice, and wherein said slots extend axially along said pipe structure and about the periphery of said pipe structure, and said visual check structure includes a plurality of radially outwardly extending ribs between said slots at said pipe, said ribs having end surfaces which are adapted to be disposed at the surface of the liquid.

4. A device for a beverage brewing machine for the heating and emulsification of liquids comprising pipe structure that has an open end and nozzle structure, said nozzle structure having an orifice from which hot steam exits for mixing with ambient air and producing a steam-and-air mixture for penetrating into the liquid and frothing it when said nozzle orifice is maintained at a small distance from the surface of the liquid, said nozzle structure being encompassed by said pipe structure such that an annular chamber is formed around said nozzle structure which chamber is open only in the direction of steam flow (Y), the open end of said chamber extending beyond said orifice of said nozzle structure, said pipe structure including a plurality of slots at a level adjacent to said orifice of said nozzle through which air, which is necessary for emulsification, can enter said annular chamber, said slots extending to said open end of said pipe structure and visual check structure fitted to said pipe structure to permit a user to maintain a defined distance (L) between said nozzle orifice and the surface of the liquid by visual check, wherein said slots extend axially along said pipe structure and about the periphery of said pipe structure, and said visual check structure includes a plurality of radially outwardly extending ribs between said slots at said pipe, said ribs having end surfaces which are adapted to be disposed at the surface of the liquid, and wherein said ribs extend to said open end of said pipe structure, and their respective end surfaces are aligned with said open end of said pipe structure.

5. The device of claim 4 wherein said radially extending ribs have outer surfaces that expand outwardly from said pipe structure towards said end surfaces.

6. The device of claim 5 wherein each said rib has the shape of a square triangle, one leg thereof forming said end surface of said rib in each case.

7. The device of claim 3 wherein each said rib extends above said slots in said pipe structure.

8. The device of claim 3 wherein at least three slots and, correspondingly, at least three ribs are provided.

9. The device of claim 4 wherein said slots have a cross-section area of fifty square millimeters in total, the diameter (d) of said nozzle orifice is about one millimeter, and the distance (L) of said nozzle orifice from the front side of said pipe structure is about three millimeters.

10. The device of claim 9 wherein said nozzle structure has a passage that expands conically from said orifice in opposition to the direction of flow (Y) from about one millimeter to about 4.8 millimeters in diameter via a step portion.

11. The device of claim 10 wherein said annular chamber has an end surface at about the level of said step portion.

12. The device of claim 9 wherein the diameter (D) of said annular chamber is about seven millimeters.

13. The device of claim 1 wherein said pipe structure forms the extension of a steam pipe.

14. The device of claim 1 and further including a coupling arrangement at the end of said pipe structure opposite said nozzle which permits coupling of said pipe structure to a steam pipe provided at a beverage brewing machine.

15. The device of claim 14 wherein said coupling arrangement including a clip-on connect.

16. The device of claim 14 wherein said coupling arrangement includes a clamping seat.

17. The device of claim 1 and further including a steam pipe with an annular groove provided at a beverage brewing machine, wherein said pipe structure has a bore, and further including a coupling arrangement at the end of said pipe structure opposite said nozzle which couples said pipe structure to said steam pipe, said coupling arrangement including a clamping seat, said clamping seat including an annular groove in said bore, and said coupling arrangement further including an O-ring mounted in said annular groove, said O-ring being engaged into said annular groove of said steam pipe when the device is disposed on said steam pipe.

18. The device of claim 1 wherein said visual check structure includes a plurality of radially outwardly extending ribs, said ribs having end surfaces which are adapted to be disposed at the surface of the liquid.

19. A device for a beverage brewing machine for the heating and emulsification of liquids comprising pipe structure that has an open end and nozzle structure, said nozzle structure having an orifice from which hot steam exits for mixing with ambient air and producing a steam-and-air mixture for penetrating into the liquid and frothing it when said nozzle orifice is maintained at a small distance from the surface of the liquid, said nozzle structure being encompassed by said pipe structure such that an annular chamber is formed around said nozzle structure which chamber is open only in the direction of steam flow (Y), the open end of said chamber extending beyond said orifice of said nozzle structure, said pipe structure including apertures at a level adjacent to said orifice of said nozzle through which air, which is necessary for emulsification, can enter said annular chamber, and visual check structure fitted to said pipe structure to permit a user to maintain a defined distance (L) between said nozzle orifice and the surface of the liquid by visual check, wherein said visual check structure includes a plurality of radially outwardly extending ribs, said ribs having end surfaces which are adapted to be disposed at the surface of the liquid, and wherein said ribs extend to said open end of said pipe structure, and their respective end surfaces are aligned with said open end of said pipe structure.

20. The device of claim 18 wherein said radially extending ribs have outer surfaces that expand outwardly from said pipe structure towards said end surfaces.

21. The device of claim 20 wherein each said rib has the shape of a square triangle, one leg thereof forming said end surface of said rib in each case.

22. The device of claim 18 wherein each said rib extends above said apertures in said pipe structure.

23. The device of claim 18 wherein at least three apertures and, correspondingly, at least three ribs are provided.

24. The device of claim 18 wherein said apertures have a cross-section area of fifty square millimeters in total, the diameter (d) of said nozzle orifice is about one millimeter, the distance (L) of said nozzle orifice from the front side of said pipe structure is about three millimeters, and the diameter (D) of said annular chamber is about seven millimeters.

* * * * *